United States Patent
Howell et al.

(10) Patent No.: US 6,893,599 B2
(45) Date of Patent: May 17, 2005

(54) METHOD FOR MAKING A REINFORCED, POLYMERIC ARTICLE IN A REACTION INJECTION MOLDING SYSTEM AND MOLD FOR USE THEREIN

(75) Inventors: Timothy B. Howell, Rochester Hills, MI (US); Robert S. Rowley, Lowell, MI (US); John F. Murphy, Imlay City, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 10/237,922

(22) Filed: Sep. 9, 2002

(65) Prior Publication Data

US 2004/0195729 A1 Oct. 7, 2004

(Under 37 CFR 1.47)

(51) Int. Cl.[7] .................................. B29C 45/18
(52) U.S. Cl. ......................... 264/328.6; 264/328.12; 425/543
(58) Field of Search ................. 264/328.6, 328.12, 264/328.9; 425/543, 4 R

(56) References Cited

U.S. PATENT DOCUMENTS

| | | | |
|---|---|---|---|
| 3,991,147 A | 11/1976 | Knipp et al. | |
| 4,097,928 A * | 6/1978 | Fries | 366/336 |
| 4,564,491 A | 1/1986 | Koestecki | |
| 4,618,322 A | 10/1986 | Lagasse | |
| 4,648,832 A | 3/1987 | Reilly et al. | |
| 4,729,863 A | 3/1988 | Muller et al. | |
| 4,767,312 A * | 8/1988 | Huttner | 425/543 |
| 4,795,667 A * | 1/1989 | Armstrong | 428/77 |
| 4,938,825 A * | 7/1990 | Macdonald | 156/245 |
| 5,098,281 A | 3/1992 | Kitamura | |
| 5,254,306 A * | 10/1993 | Inada et al. | 264/572 |
| 5,346,387 A | 9/1994 | Muller et al. | |
| 5,409,654 A | 4/1995 | Platusich | |
| 5,422,059 A | 6/1995 | Hettinga | |
| 5,423,673 A | 6/1995 | Sawae et al. | |
| 5,681,867 A | 10/1997 | Brown | |
| 5,728,343 A | 3/1998 | Ueno | |
| 5,753,155 A | 5/1998 | Hanusa | |
| 5,770,141 A | 6/1998 | Schulte et al. | |
| 6,060,004 A | 5/2000 | Takeuchi et al. | |
| 6,090,327 A * | 7/2000 | Churchwell | 264/328.12 |
| 6,197,242 B1 | 3/2001 | Parks et al. | |
| 6,221,290 B1 | 4/2001 | Waddington et al. | |

* cited by examiner

Primary Examiner—Jill L. Heitbrink
(74) Attorney, Agent, or Firm—Brooks Kushman P.C.

(57) ABSTRACT

A mold for use in a reaction injection molding method and system to make a reinforced polymeric article having reduced surface defects includes a novel gating system. The mold includes a pair of mold sections which define a closed, article-forming cavity, an injection aperture, and an after-mixer which helps to form a plurality of flow paths which extend downstream from the injection aperture toward the article-forming cavity to further mix a curable, multi-component, reaction fluid mixture including a filler. The flow paths are also at least partially defined by an elongated film gate and an elongated runner which extends along and is in fluid communication with the film gate along substantially the entire length of the film gate. The runner has a closed end and an open end into which a fluid mixture for the article flows for distribution by the runner into the film gate.

11 Claims, 3 Drawing Sheets

US 6,893,599 B2

METHOD FOR MAKING A REINFORCED, POLYMERIC ARTICLE IN A REACTION INJECTION MOLDING SYSTEM AND MOLD FOR USE THEREIN

BACKGROUND OF THE INVENTION

1. Field of the Invention

This invention relates to methods for making reinforced, polymeric articles in reaction injection molding systems, molds for use therein and articles produced thereby.

2. Background Art

Reaction injection molding (RIM) is a process by which highly chemically reactive liquids are injected into a mold where they quickly polymerize to form a coherent, molded article. Some of the most common RIM processes involve a rapid reaction between highly catalyzed polyether or polyester polyol and isocyanate constituents. The constituents are stored in separate tanks prior to molding and are first mixed in a mixhead upstream of a mold. Once mixed, they react rapidly to gel and then harden to form polyurethane polymers.

As described in U.S. Pat. No. 5,753,155, rigid foam applications have struggled for many years with problems caused by liquid turbulence and splashings of the chemical stream into the part being foamed. The net result of this turbulence is the entrainment of air in the chemical stream, splashing of chemicals onto the internal part surfaces, uneven distribution of chemicals, and mixing of already reacting chemicals with new materials being introduced into the part. Depending on the size and complexity of the part, this results in surface voids, air entrapment, weak subsurface areas and flow restrictions. The consequences can be poor surface quality, reduced physical properties, and potential of blister formation or even catastrophic failure.

In the rigid and flexible molded area, this turbulence has, in some cases, been reduced by specially designed mixheads. Unfortunately, these mixheads are very costly, generally lose their effectiveness with high output foam machines, and often cannot be used because of their large size and complexity. In the RIM area, a sophisticated gating technology has been developed to assist in mixing and directing liquid chemicals so that these flow into molds in laminar fashion (see, e.g., U.S. Pat. No. 3,991,147). These so-called gates are typically precision-machined into the mold or into a steel block permanently attached to the mold.

Although reaction injection molded urethanes have many desirable physical characteristics, they also have generally high coefficients of thermal expansion (CTE), poor dimensional stability over wide temperature ranges and considerable flexibility at room temperature. Moreover, a large, filler-free RIM panel when attached to a rigid support structure may permanently buckle and wave at elevated temperatures. Thus, as molded, unreinforced RIM urethanes are not generally directly suitable for use as large automotive panels or in other semistructural or structural panel applications. Furthermore, the larger the surface area and thinner the aspect of a panel, the more serious these problems become.

The use of reinforcing fillers in RIM urethanes has been extensively examined. For example, reinforced reaction injection molding (RRIM) technology has been utilized for 25 years for automotive fascia and body side moldings. More recently, RRIM has been used for pick-up truck fenders. Today's applications demand high performance in processing and part performance. Parts molded in polyurethane RRIM systems such as the Bayflex® 190 elastomeric polyurethane/polyurea RRIM system of the Bayer Corporation of Pittsburgh, Pa., have difficulty in maintaining laminar-like flow during mold filling, especially for large exterior automotive body panels such as car or truck fenders where as much as 18 pounds of material flow into the article-forming cavity within a mold in less than a second. As a result, flow lines or surface waviness can be seen in the gate area of the part using conventional RIM gating systems. These lines result in an unacceptable part, particularly noticeable when the part is coated with glossy paint.

As described in detail in U.S. Pat. No. 4,648,832, FIG. 1 illustrates a prior art after-mixer and gating apparatus, generally indicated at 10 and generally including an after-mixer block or body 12 and a gating block or body 14 positioned in one or the other of the mold halves for further mixing the constituents of RIM material and admitting the RIM material to a mold cavity 16.

The after-mixer body 12 includes at least one common inlet passageway 18 for receiving the RIM material from a high-pressure mixing apparatus (not shown) at a predetermined flow rate and pressure. The RIM material flows through the inlet passageway 18 into at least one pair of curvilinear mixing passageways 22 and 24 where it is separated into a corresponding number of flow streams. Such separation increases the turbulence of the RIM material flow and accordingly enhances the intermixing of its constituents. The mixing passageways 22 and 24 include an inverted U-shaped divider wall 26 therein, which form a generally serpentine path in the mixing passageways 22 and 24. Such serpentine path includes at least one bight portion 28 in the mixing passageway 22 and a similar bight portion 30 in the mixing passageway 24. Such bight portions 28 and 30 cause the RIM material to substantially reverse its direction of flow, as indicated by the flow arrows 32 and 34, respectively, in order to increase the turbulence of each of the RIM material flow streams and enhance the intermixing of the constituents therein.

Once the RIM material flows through the mixing passageways 22 and 24, it enters a corresponding number of respective inlet openings 36 and 38 of at least one common mixing cavity 40. The flow streams from the mixing passageways 22 and 24 are reunited in the mixing cavity 40 which again reverses the flow directions of the flow streams, increases their turbulence, and enhances the intermixing of the material constituents. The reunited and intermixed material from the mixing cavity 40 is received by an inlet passageway 42 in the gating body 14, wherein it is conveyed through a diverging fan-gate passageway 44 to the mold cavity 16.

The following U.S. patents disclose various RIM systems: U.S. Pat. Nos. 4,564,491; 4,729,863; 5,346,387; 5,681,867; 5,770,141; 6,197,242; and 6,221,290.

The following U.S. patents disclose various gating systems for molds: U.S. Pat. Nos. 4,618,322; 5,098,281; 5,409,654; 5,422,059; 5,423,673; 5,728,343; and 6,060,004.

However, despite all of the above-noted prior art, the above-noted problem still exists.

SUMMARY OF THE INVENTION

An object of the present invention is to provide a method for making a reinforced, polymeric article in a reaction injection molding system, mold for use therein and article produced thereby with less surface-waviness or flow lines than articles made heretofore with conventional RIM molding systems.

In carrying out the above object and other objects of the present invention, a method for making a reinforced, polymeric article having reduced surface defects in a reaction injection molding system is provided. The system includes a mold having an injection aperture and at least one flow path which extends from the injection aperture to a closed, article-forming cavity in the mold. The at least one flow path is at least partially defined by an elongated film gate and a runner which extends along and is in fluid communication with the film gate along substantially the entire length of the film gate. The method includes injecting an amount of curable, multi-component, reaction fluid mixture including a filler through the injection aperture and along the at least one flow path wherein the amount is sufficient for the preparation of the article. The method further includes forcing the fluid mixture to flow into and along the runner in a first direction, and forcing the fluid mixture to flow from the runner and into the film gate and the article-forming cavity in a second direction substantially perpendicular to the first direction so that the fluid mixture enters the article-forming cavity as a laminar stream. The method then includes curing the fluid mixture within the article-forming cavity to form the reinforced polymeric article which has a substantially wave-free surface.

The runner may be an elongated runner having an open end and a closed end wherein the fluid mixture is forced to flow into the open end of the runner in the first direction.

The method may further include mixing components of the fluid mixture with a plurality of flow paths which converge to a passageway of the flow path upstream the runner. The runner may extend in the first direction beyond the film gate.

The method may further include forcing the fluid mixture to flow within the passageway initially in a third direction substantially perpendicular to the first direction and then in the first direction into the runner.

The article may be a panel such as an automotive exterior body panel. The body panel may be a car or truck fender.

Further in carrying out the above object and other objects of the present invention, a mold for use in a reaction injection molding system for making a reinforced polymeric article having reduced surface defects is provided. The mold includes a pair of mold sections which define a closed, article-forming cavity, an injection aperture, and at least one flow path which extends from the injection aperture to the article-forming cavity. The at least one flow path is at least partially defined by an elongated film gate and an elongated runner which extends along and is in fluid communication with the film gate along substantially the entire length of the film gate. The runner has a closed end and an open end into which a fluid mixture for the article flows for distribution by the runner into the film gate.

The mold may further include an after-mixer having a plurality of flow paths extending downstream the injection aperture and upstream the runner to enhance intermixing components of the fluid mixture by increasing turbulence of the fluid mixture.

The mold may further include a passageway for conveying the fluid mixture from the after-mixer to the open end of the runner. The passageway may bend approximately 90 degrees.

Still further in carrying out the above object and other objects of the present invention, a reinforced reaction injection molded article formed by the above-noted method is provided.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
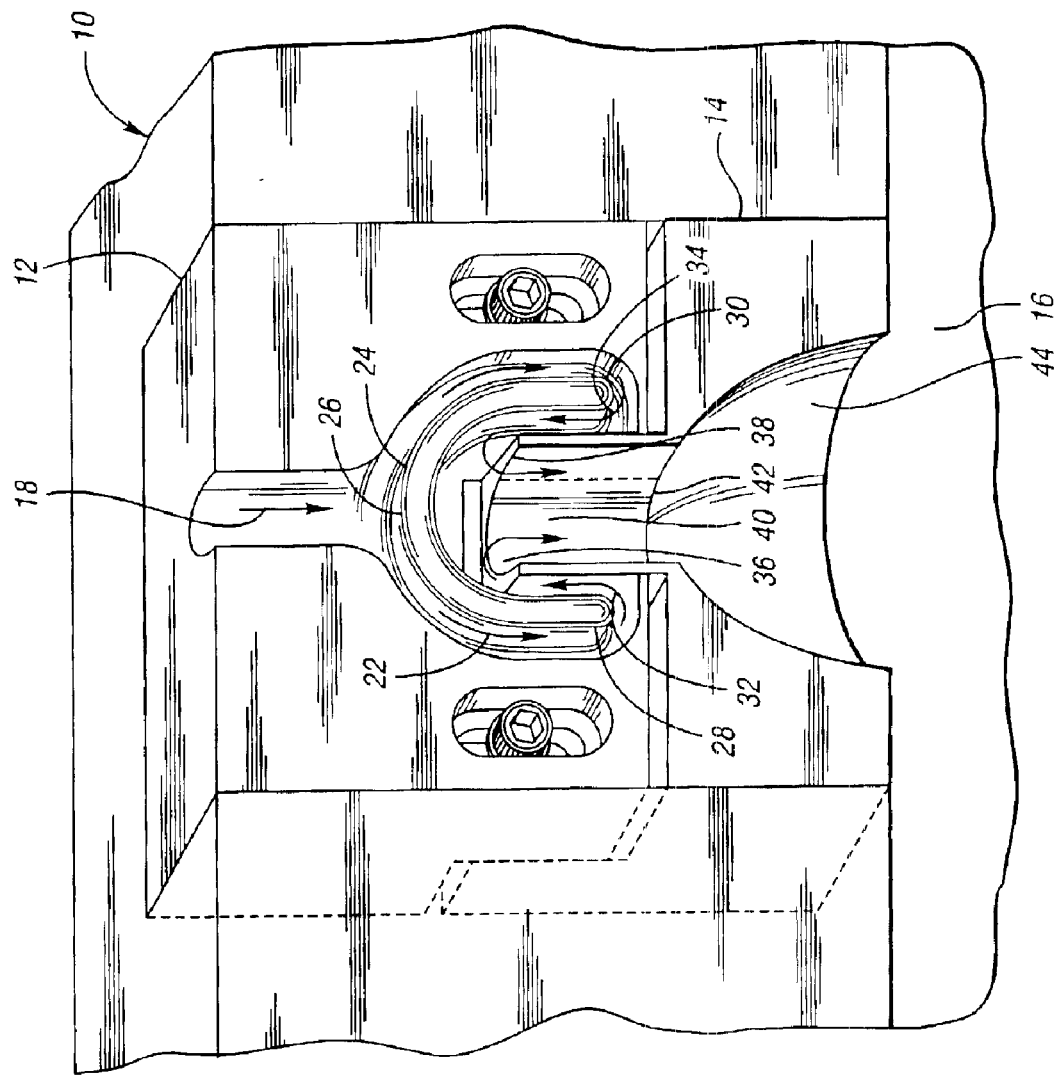
FIG. 1 is a perspective view of a conventional, prior art after-mixer and gating apparatus for a reaction injection molding apparatus.
Figure 2:
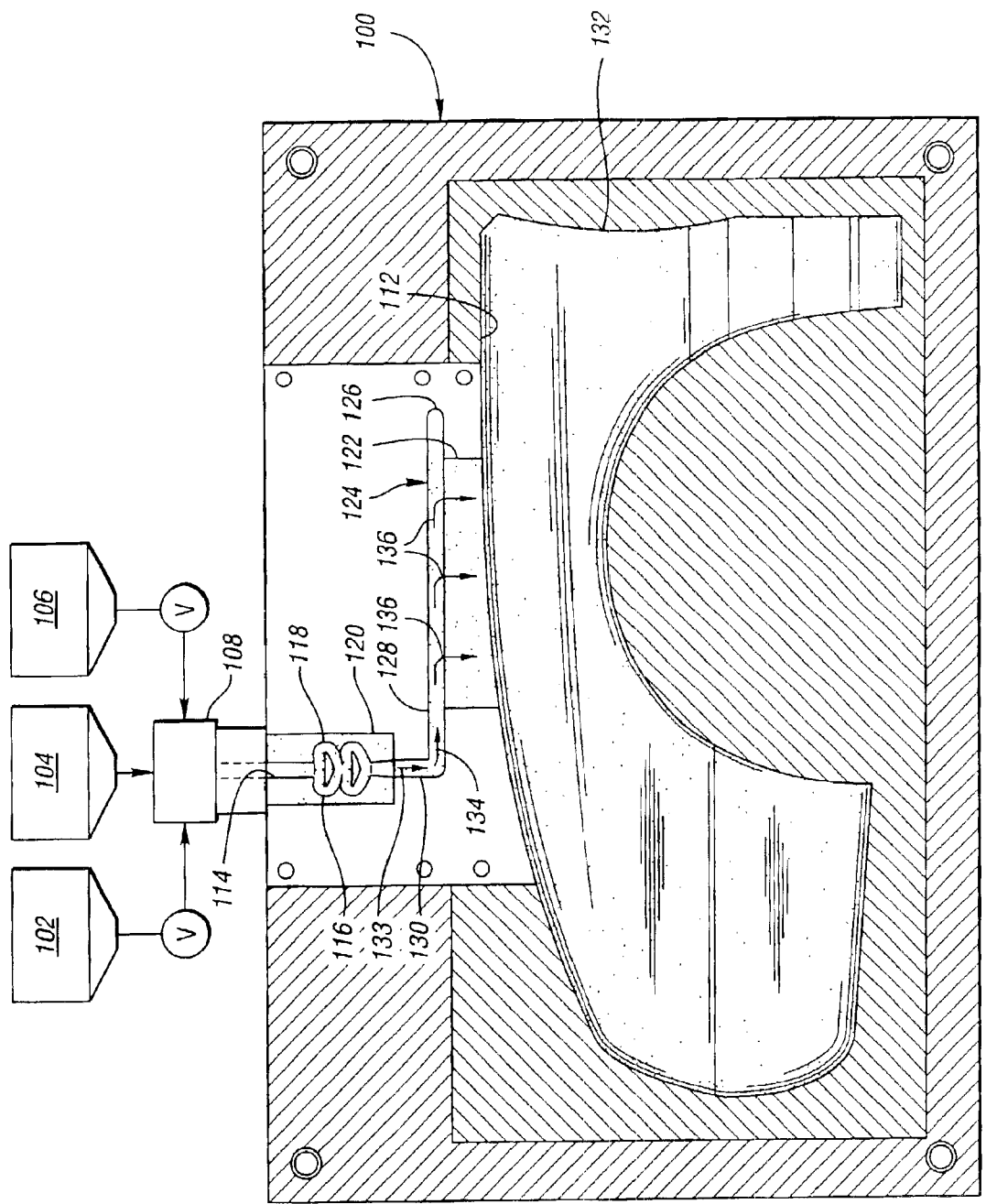
FIG. 2 is a schematic view, partially in cross-section, of a reaction injection molding apparatus including an open mold and gating system of the present invention, and illustrating an article and attached dross.
Figure 3:
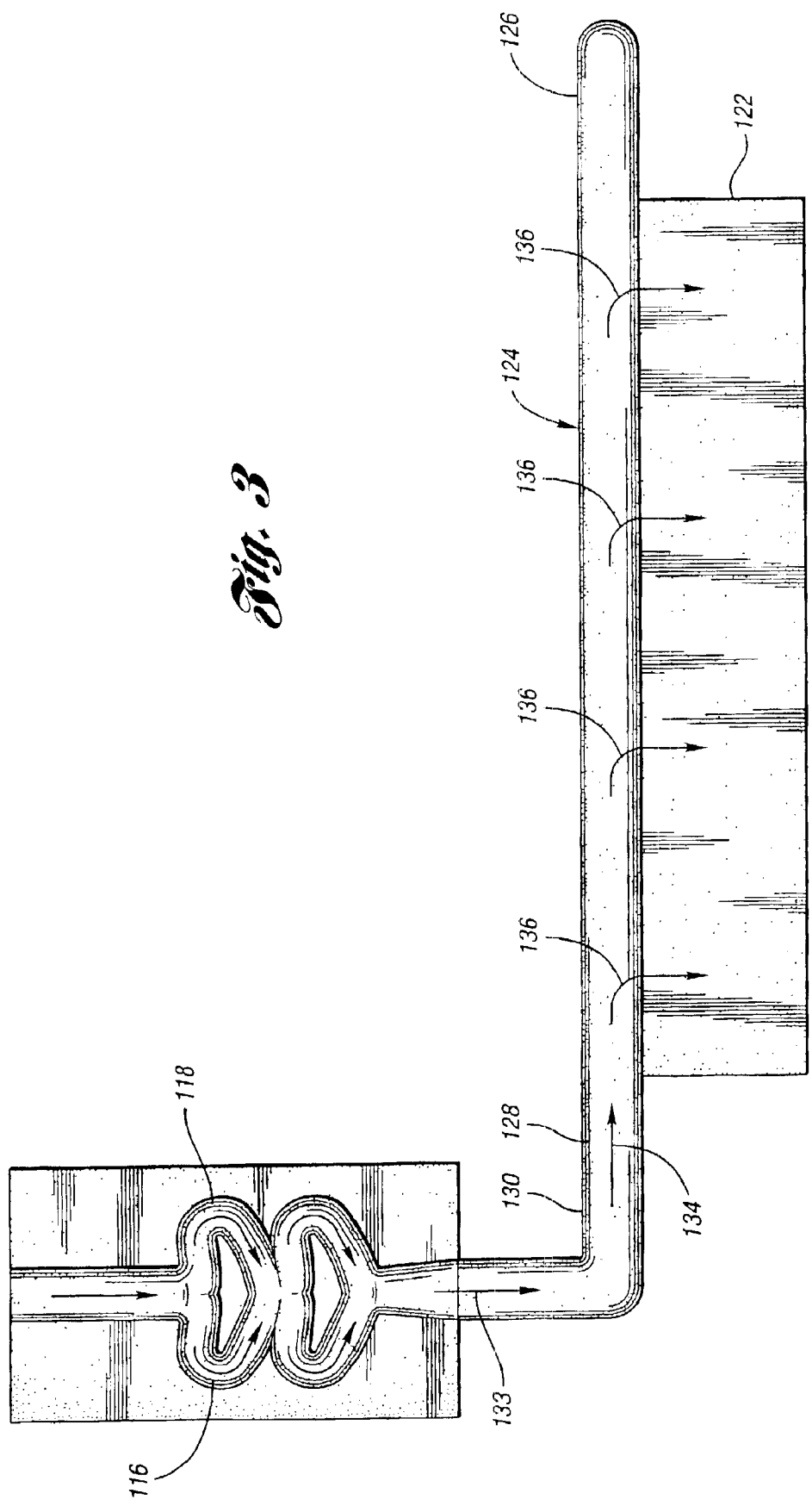
FIG. 3 is a side elevational view of plastic dross taken from the mold of FIG. 2 and removed from the article to illustrate the flow paths of plastic within an after-mixer and gating system of the present invention.

The present invention is generally an improved method, a mold used therein, and a part formed thereby wherein a novel gating system is used in the method and mold. Referring to FIGS. 2 and 3, the mold, generally indicated at 100, is typically used in a reaction injection molding system for making a reinforced polymeric article having reduced surface defects. The molding system typically includes sources 102, 104 and 106 of material which make up a curable, multi-component reaction fluid mixture such as a liquid urethane material. The urethane material may include a polyol resin component, an isocyanate constituent, a catalyst and a filler. An example of such commercially-available systems is Bayflex® 190, as previously mentioned, having a mica filler of approximately 18%.

Components or constituents of the urethane material are injected from the sources 102, 104 and 106 into a high pressure mixing apparatus 108 by way of respective metering devices. The fluid mixture with filler is then conveyed to the mold 100.

The mold 100 includes a pair of mold sections, only one of which is shown at 110, which when closed define a closed, article-forming cavity 112. The mold 100 also includes an injection aperture 114 and a pair of flow paths 116 and 118 which extend from the injection aperture 114 to the article-forming cavity 112. The flow paths 116 and 118 which alternately converge and diverge within a static after-mixer, one-half of which is shown at 120. The flow paths 116 and 118 otherwise converge both upstream and downstream of the after-mixer 120 to enhance intermixing the components of the fluid mixture by increasing turbulence of the fluid mixture.

The flow paths of the fluid mixture within the mold 100 are at least partially defined by an elongated film gate 122 and an elongated runner, generally indicated at 124, which extends along and is in fluid communication with the film gate 122 along substantially the entire length of the film gate 122. The runner 124 has a closed end 126 and an open end 128 into which the fluid mixture for the article flows for distribution by the runner 124 into the film gate 122. The runner 124 preferably extends beyond the film gate 122 to help ensure laminar-like flow of the fluid mixture.

The mold 100 further includes a passageway 130 for conveying the fluid mixture from the after-mixer 120 to the open end 128 of the runner 124. The passageway 130 bends approximately 90 degrees so that the passageway 130 extends in the same direction as the runner 124.

The article formed by the molding system is typically a panel such as an automotive exterior body panel and may be a car or truck fender 132.

A method for making the reinforced, polymeric article or fender 132 is now described. The fender 132 has reduced surface defects in the gating area of the part compared to the prior art.

The method includes the step of injecting an amount of curable, multi-component, reaction fluid mixture, such as Bayflex® 190, including a filler such as 18% mica, through the injection aperture 114 and along the flow paths 116 and 118 to further mix the mixture. The amount injected is sufficient for the preparation of the fender 132.

The method may further include forcing the fluid mixture to flow within the passageway 130 initially in a direction indicated by arrow 133 and then in a direction indicated by arrow 134 toward the runner 124.

The method further includes forcing the fluid mixture to flow into and along the runner 124 in the direction indicated by the arrow 134.

The method then includes forcing the fluid mixture to flow from the runner 124 and into the film gate 126 and into the article-forming cavity 112 in a direction indicated by arrows 136 substantially perpendicular to the direction 134 so that the fluid mixture enters the article-forming cavity 112 as a laminar stream, especially when the cavity 112 is almost filled.

The method then includes curing the fluid mixture within the article-forming cavity 112 to form the reinforced polymeric fender 132 which has a substantially wave-free surface in the gate area of the part 132 when compared to prior methods.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for making a reinforced, polymeric article having reduced surface defects in a reaction injection molding system including a mold having an injection aperture and at least one flow path which extends from the injection aperture to a closed, article-forming cavity in the mold, the at least one flow path being at least partially defined by an elongated film gate and a runner which extends along and is in fluid communication with the film gate along substantially the entire length of the film gate, the method comprising:

injecting an amount of curable, multi-component, reaction fluid mixture including a filler through the injection aperture and along the at least one flow path wherein the amount is sufficient for the preparation of the article;

mixing components of the fluid mixture with a plurality of flow paths which converse to a passageway of the flow stream upstream the runner after the step of injecting;

forcing the fluid mixture to flow within the passageway initially in a first direction and then in a second direction substantially perpendicular to the first direction;

forcing the fluid mixture to flow into and along the runner in the second direction;

forcing the fluid mixture to flow from the runner and into the film gate and the article-forming cavity in a third direction substantially perpendicular to the second direction so that the fluid mixture enters the article-forming cavity as a laminar stream; and curing the fluid mixture within the article-forming cavity to form the reinforced polymeric article which has a substantially wave-free surface.

2. The method as claimed in claim 1 wherein the runner is an elongated runner having an open end and a closed end and wherein the fluid mixture is forced to flow into the open end of the runner in the second direction.

3. The method as claimed in claim 1 wherein the runner extends in the second direction beyond the film gate to help ensure laminar-like flow of the fluid mixture.

4. The method as claimed in claim 1 wherein the article is a panel.

5. The method as claimed in claim 4 wherein the panel is an automotive exterior body panel.

6. The method as claimed in claim 5 wherein the body panel is a car or truck fender.

7. A mold for use in a reaction injection molding system for making a reinforced polymeric article having reduced surface defects, the mold comprising:

a pair of mold sections which define a closed, article-forming cavity;

an injection aperture, an after-mixer including a plurality of flow paths extending downstream the injection aperture to enhance intermixing components of the fluid mixture by increasing turbulence of the fluid mixture;

a passageway for conveying the fluid mixture from the after-mixer, wherein the passageway bends approximately 90 degrees; and at least one flow path which extends from the passageway to the article-forming cavity, the at least one flow path being at least partially defined by an elongated film gate and an elongated runner which extends along and is in fluid communication with the film gate along substantially the entire length of the film gate wherein the runner has a closed end and an open end into which a fluid mixture for the article flows from the passageway for distribution by the runner into the film gate.

8. The mold as claimed in claim 5 wherein the runner extends beyond the film gate to help ensure laminar-like flow of the fluid mixture.

9. The mold as claimed in claim 7 wherein the article is a panel.

10. The mold as claimed in claim 9, wherein the panel is an automotive exterior body panel.

11. The mold as claimed in claim 10, wherein the body panel is a car or truck fender.

\* \* \* \* \*

UNITED STATES PATENT AND TRADEMARK OFFICE
CERTIFICATE OF CORRECTION

PATENT NO. : 6,893,599 B2
DATED : May 17, 2005
INVENTOR(S) : Timothy B. Howell et al.

It is certified that error appears in the above-identified patent and that said Letters Patent is hereby corrected as shown below:

Column 5,
Line 57, delete "converse" and insert -- converge --.

Signed and Sealed this

Ninth Day of August, 2005

JON W. DUDAS
*Director of the United States Patent and Trademark Office*